United States Patent

[11] 3,562,603

| | | |
|---|---|---|
| [72] | Inventor | Willis R. Smith<br>Rochester, N.Y. |
| [21] | Appl. No. | 771,825 |
| [22] | Filed | Oct. 30, 1968 |
| [45] | Patented | Feb. 9, 1971 |
| [73] | Assignee | General Signal Corporation<br>Rochester, N.Y.<br>a corporation of New York |

[54] MAGNETIC REED PROXIMITY DETECTOR
7 Claims, 3 Drawing Figs.

[52] U.S. Cl. .............................................. 317/157,
307/132; 246/249, 246/255
[51] Int. Cl. ..................................................... H01h 47/00;
B61l 11/08, B61l 13/04
[50] Field of Search ............................................ 307/116,
132MR; 328/5; 340/258, 259, 266, 274, 277, 278,
280; 317/123D, 157; 335/152

[56] References Cited
UNITED STATES PATENTS

| | | | | |
|---|---|---|---|---|
| 2,201,031 | 5/1940 | Eichelberg | | 307/132 |
| 2,550,605 | 4/1951 | Schenck | | 307/132 |
| 3,011,036 | 11/1961 | La Rocca | | 340/259X |

*Primary Examiner*—Lee T. Hix
*Attorney*—Harold S. Wynn

ABSTRACT: This device detects the proximity of magnetic objects, and comprises a permanent magnet associated with a spaced reed relay which has its contact normally held in an actuated position by the flux from the magnet. Such contact is released when flux from the magnet is diverted to a different path by the presence of a magnetic body; but restoration of normal flux from permanent magnet does not actuate the contact. A coil surrounding the reed relay contact is energized from a repeater relay when the reed contact is released. Thus, oscillation occurs during the detection of an object but stops during the absence of such object. Relay means is provided to be responsive to the steady state condition of the repeater relay, but to be unresponsive to an oscillatory condition. Such relay means, when responsive to the steady state of the reed relay contact, also provides a slight holding effect in addition to the normal flux from the permanent magnet to render the reed relay contact less responsive to the diversion of flux from the permanent magnet; but, when the reed relay contact is once released, such holding effect is removed so that the oscillatory condition is steadily maintained until the magnetic object is removed and the diversion of flux is stopped. This provides a positive acting and a sensitive proximity detector for relatively high speed operation.

INVENTOR
W. R. SMITH
BY *Forest B. Hitchcock*
HIS ATTORNEY

MAGNETIC REED PROXIMITY DETECTOR

BACKGROUND OF THE INVENTION

This invention relates to a magnetic reed proximity detector, and more particularly relates a proximity detector which is particularly useful in connection with railroads, since it detects magnetic objects passing at very high speeds.

The prior art shows proximity detectors of varying types which are responsive to a passing magnetic object and which consists of a magnetically operated switch mounted in spaced relation to a source of magnet flux. Such source of flux is arranged to project a first field or flux into the path of the passing object and a second field of flux through the magnetically operated switch to urge its contact to an actuated position during the absence of a magnetic object. However, when a passing magnetic object is within the first magnetic field, there is sufficient flux diverted or shifted away from the second magnetic field and including the switch to allow such switch to be deactivated and released; but when the magnetic object moves out of the first flux field, the flux in the second field reverts to a value sufficient to actuate the magnetic switch. In other words, the device operates on the pickup value of the switch.

The present invention proposes to operate on the release value of the switch. Since such release value is usually considerably less than the pick up value, the detection of the present invention is considerably more sensitive and operates over a greater distance than those detectors shown in the prior art.

In addition, another purpose of the present invention is to provide a proximity detector which will respond positively to the entrance of a magnetic object into its field of detection, and it will similarly respond to very fast moving magnetic objects.

A further object of the invention is to provide a way of slightly desensitizing the detector until the magnetic body is sufficiently close to the detector as to provide a positive actuation thereof.

SUMMARY

In the proximity detector of this invention, a permanent magnet has a flux field which reaches out to a spaced reed relay and acts upon the contact thereof. A repeater relay is energized upon the actuation of the reed relay contact and is deenergized upon the release of that contact. The contact of the reed relay is biased to a nonactuation position in which it is held by the flux from the permanent magnet during the absence of a magnetic body, but the flux from the permanent magnet is insufficient to actuate such contact to that position. There is control means including a coil adjacent the contact of the reed relay which is energized upon the release of the repeater relay which produces sufficient flux to actuate the contact. When a magnetic body approaches the detector and diverts sufficient flux from the reed relay to a different magnetic field, the reed relay allows its contact to release and initiates an oscillatory condition between itself and the repeater relay.

In the combination as above outlined, the oscillatory action stops when the magnetic body moves away and allows sufficient flux from the permanent magnet to hold the reed contact in an operated position. In addition, there is means for partially energizing the coil adjacent the reed relay contact when there is no oscillatory condition so as to require the approach of the magnetic body slightly closer to the detector before the reed relay contact is released. Such means is rendered ineffective immediately upon the release of the reed contact so that the oscillatory condition is strongly established following the first release of the reed relay contact.

For a better understanding of the invention, together with other and further objects thereof, reference is had to the following description, taken in connection with the accompanying drawings, while its scope will be pointed out in the appended claims.

The preferred embodiment of the present invention comprises a reed relay RR having a contact 7 adapted for actuation by external magnetic flux. This reed relay RR is located at a spaced distance from a permanent magnet PM which produces a field of flux passing through the reed relay RR. However, the spacing of the reed relay RR from the permanent magnet PM is such that the flux will just hold the contact 7 in a closed position but is ineffective to actuate it to that position. A winding or coil 6 is located around the reed relay RR and its contact 7 which coil 6 is energizable by a repeater relay A upon the opening of the reed relay contact 7.

Thus, as a magnetic body such as the designated "Iron Body" passes within sufficiently close range of the detector structure, it will cause the flux from the permanent magnet PM to form a field of flux different than the one including the reed relay RR. This in effect diverts the flux away from the reed relay RR and causes its contact 7 to open. Such a condition then causes the repeater relay A to be deenergized, which, in turn causes the energization of the coil 6 to again actuate the contact 7. This reenergizes the repeater relay A which then deenergizes the coil 6 which allows the contact 7 to open. This operation occurs repeatedly and establishes what may be conveniently termed an oscillatory condition.

A relay B which is quick in releasing but somewhat slow to pickup, is controlled by the repeater relay A to immediately release upon the first release of the reed relay contact 7 but a subsequent energization of this slow relay causes it to delay its picking up for a substantially longer period of time than its released period In other words, this relay is deliberate in its action and causes a longer output pulse than the input to it. Also, this relay does not respond to an oscillatory condition.

Figure 1:
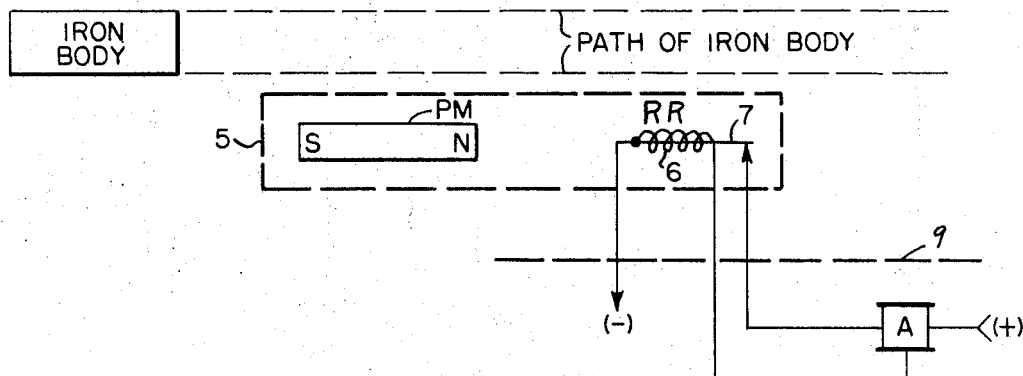
FIG. 1 is a diagrammatic illustration of the magnetic proximity detector of the present invention.

With reference to FIG. 1 of the drawings, the detection device 5 constitutes a molded plastic body encapsulating the permanent magnet PM and the reed relay RR with its actuating winding 6. The permanent magnet PM is shown as being a round rod with north and south poles N and S. This permanent magnet PM is preferably of the type of magnet which has a high energy product curve. For example, a permanent magnet of Alnico V would be satisfactory. Although the drawing shows a straight magnet, and the reed relay RR located on the axis of the poles of the permanent magnet, this exact arrangement may well not be necessary. But the configuration of the arrangement should be such that a flux path may be readily established by the foreign magnetic object to cause the flux to be diverted away from the reed relay RR.

The reed relay RR has a contact 7 which is formed of two parts in a way to cause contact to be made when flux is passed through these parts; but these parts are normally biased away from each other by inherent spring construction to be normally open in the absence of an operating or holding flux. Surrounding this reed relay RR which includes an incapsulating glass or plastic structure, is a suitable coil or winding 6 which when energized causes the contact 7 of the reed relay RR to be actuated. This reed relay RR and coil 6 is separated from the permanent magnet PM by a suitable distance such that the flux is sufficient to hold the reed relay contact actuated but is insufficient to initially cause its actuation. In this connection, the reed contacts will be suitably coated to both act as good contact making material and at the same time acts as a nonmagnetic material to avoid residual flux in the contacts from holding them together. Since the relays A and B are electromagnetic relays, they should be separated from the permanent magnet PM so as to not be effected by it. Such separation is indicated by the dotted line 9.

A repeater relay A is connected by suitable circuitry to the reed relay contact 7 so as to be energized when such reed relay contact is closed; but to be unactuated or released when the reed relay contact 7 is open or released.

The relay B is a fast operating relay and same as relay A so that it releases quickly when the relay A opens its front contact 11. But this relay B is made slow to pickup by reason of the capacitor 17 being connected into its energizing circuit when the back contact 16 is closed.

When the relay B is picked up, it closes front contact 14 to partially energize the coil 6 though a circuit including resistor 15. This partial energization of coil 6 adds holding flux to the holding flux provided by the permanent magnet PM. This means that when a magnetic or iron body approaches the detector device, it must approach slightly closer to divert sufficient flux from the reed relay to cause its release.

The operation of the proximity detector will now be discussed. Let us assume that the "Iron Body" of FIG. 1 approaches the detecting structure 5. When it reaches a predetermined position with regard to the permanent magnet PM sufficient flux is diverted or shifted to the "Iron Body" to decrease the flux in the reed relay RR just slightly below its holding value. Such reduction causes the contact 7 to open and release the relay A, which in turn opens front contact 11 and drops the relay B. The back contact 10 of relay A reenergizes the coil 6 and actuates the contact 7 to its closed position. This in turn reenergizes the relay A causing it to pickup and open back contact 10 which in turn releases the contact 7. This oscillatory condition is maintained so long as the magnetic or "Iron Body" body is diverting flux away from the reed relay RR.

In the operation just described, the relay B is released immediately upon the opening of front contact 11, and before the relay A can again energize winding 6. If the "Iron Body" or magnetic object quickly passes out of range of the permanent magnet PM and the relay RR and relay A are both held picked up, the B relay is energized through front contact 11 and picks up following the charging of capacitor 17 which is its usual timing operation. The closure of front contact 14 again acts to slightly desensitize the detector's operation.

In brief, if the speed of passage of the magnetic body is such that the relay A is released only once, such release will cause the B relay to drop away but to delay its pickup for its usual time. This is because the closure of back contact 16 of relay B together with the closure of back contact 11 of relay A causes the discharge of capacitor 17 just before the application of energy to relay B and capacitor 17 through front contact 11.

On the other hand, in the event the "Iron Body" remains in the field of the permanent magnet PM and diverts the flux from the permanent magnet away from the reed relay RR for a considerable period of time, the reed relay RR and the relay A will initiate an oscillatory condition which is maintained throughout the presence of the "Iron Body." However, the relay B is not picked up during the oscillatory condition. This is because the capacitor 17 is repeatedly discharged through back contacts 16 and 11, and the application of energy through front contact 11 is intermittent and does not sufficiently charge the capacitor 17 to cause the relay B to pickup. In this way the relay B is maintained deenergized until the "Iron Body" or magnetic material moves away from the permanent magnet PM to allow sufficient flux to pass through the reed relay RR to hold its contact 7 in an actuated position.

In one organization embodying the invention, the permanent magnet PM was constructed of Alnico Steel and was about 6 inches long and 1 inch in diameter. The reed relay RR was separated from the permanent magnet PM a distance of approximately 5 inches. The relays A and B employed would operate at slightly under 1 millisecond and would ordinarily release in substantially the same time. However, the capacitor 17 was chosen to cause the relay B to be delayed in its pickup for approximately 5 milliseconds. Such slow pickup would assure the positive operation of contact 18 so that its back contact 18 would be closed for a minimum of 5 milliseconds. This would assure the proper response of any apparatus included in its output circuit.

The resistor 15 was so chosen that the release of the reed relay contact 7 would occur when the "Iron Body" was about 3½ inches from the permanent magnet PM. In other words, without the connection of contact 14 and resistor 15, the "Iron Body" would cause the reed relay RR to release when it was about 4 inches from the permanent magnet PM. Thus, the addition of the front contact 14 and resistor 15 reduced the sensitivity of the structure about one-half inch in the distance it would detect.

When the metallic object passed out of the field of the permanent magnet PM, it had to be removed substantially 4 inches before the holding effect of the permanent magnet PM was reestablished on the reed relay contact 7.

Figure 2:
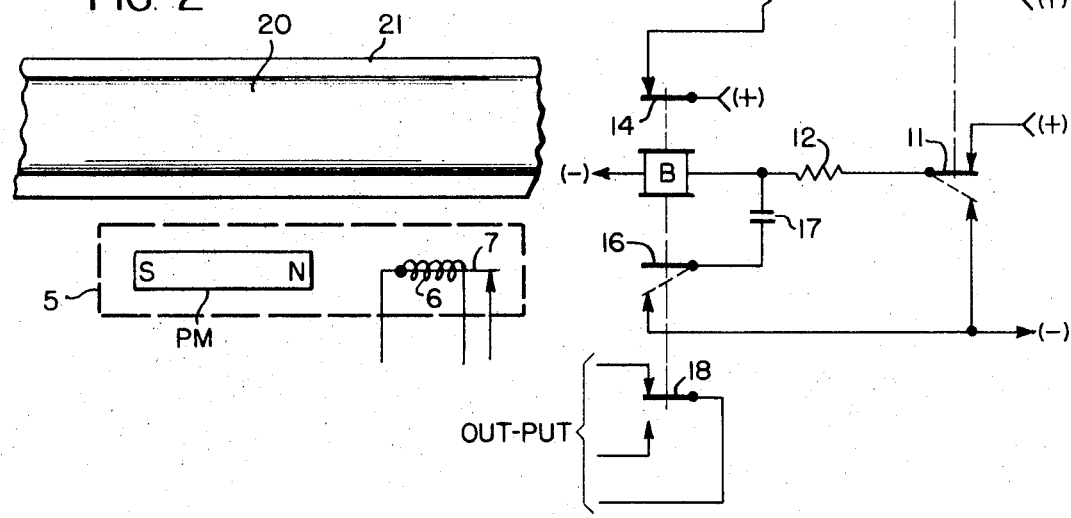
FIG. 2 is a top view of the proximity detector located beside a railroad track rail.
Figure 3:
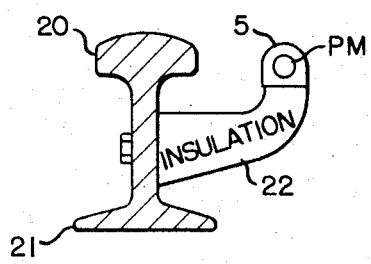
FIG. 3 is an end view of FIG. 2 to illustrate the magnetic isolation of the proximity detector from the stock rail structure.

With reference to FIG. 2, the detecting apparatus 5 is located to the side of the railhead as illustrated in FIG. 3. This distance from the railhead can be in the order of 3 to 4 inches. It is assumed that detecting apparatus 5 is on the inside of the railhead 20 so that the flange of the wheel will travel along the rail within a distance of 2 to 3 inches from the permanent magnet PM. The detecting apparatus 5 is wholly insulated from the rail magnetically by suitable insulation 22 supporting it on the rail web just above the base 21 of the rail. Since there is a leakage of the magnetic flux from the permanent magnet PM through the railhead 20, it tends to shift some of the holding flux away from the reed relay RR. This means that the reed relay RR must be closer to the permanent magnet in this form than illustrated and described for FIG. 1. The contact 7 must be just held in an operated position by the permanent magnet PM when it is actuated by the coil 6 during the absence of a railroad wheel. Otherwise the operation for the detection of the wheel passage is exactly analogous to that already described.

As previously mentioned, this proximity detector operates upon the principle of repeatedly testing whether or not there is sufficient holding flux from the permanent magnet to maintain contact 7 in an operated position. This then causes the detecting apparatus to work, so to speak, upon the holding effect on the contact in contradistinction to a device which works upon the pickup value. By this structure, the proximity detector will approximately detect for twice the distance that can be achieved with a device working on the pickup value. Also, the desensitizing circuit assures positive action not otherwise obtainable.

While there have been described what are at present considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

I claim:

1. A detector for manifesting the proximity of a ferromagnetic object comprising:
   a. a permanent magnet having a flux field associated therewith;
   b. a set of reed contacts located in said field and held closed thereby against a bias to a normally open or set condition;
   c. a repeater relay energized in accordance with the closed or reset condition of said reed contacts; and
   d. control means responsive to the deenergization of the repeater relay for resetting said reed contacts to a closed condition, said field having sufficient energy to hold said reed contacts reset only after initial actuation of said control means whereby a diversion of the flux field occasioned by the presence of the ferromagnetic object causes said reed contacts and repeater to assume an oscillatory condition thereby manifesting object presence.

2. The detector of claim 1 wherein said control means includes a winding adapted when energized through a back contact of said repeater relay for resetting said reed contacts.

3. The detector of claim 1 further including means responsive to the condition of said repeater relay for providing indication of object presence when said repeater is in an oscillating condition.

4. The detector of claim 3 wherein said means includes a slow pickup relay energized for indicating object presence in response to an energized condition of said repeater and deenergized for providing indication of object presence when said repeater is in an oscillatory condition.

5. The detector of claim 4 wherein said means includes a capacitor-resistor network for providing the slow release characteristic to said slow release relay.

6. The detector of claim 4 wherein said control means further includes a resistor in series with said winding and a front contact of said slow release relay for partially energizing said winding for providing additional holding flux to the field of said permanent magnet relay.

7. The detector of claim 1 adapted to detect the presence of railroad vehicle wheels, said detector including means for mounting said detector adjacent to the path of a passing wheel and wholly insulated from the rails.